(12) United States Patent
Platt

(10) Patent No.: US 8,862,877 B2
(45) Date of Patent: Oct. 14, 2014

(54) DATA ANONYMITY SYSTEM

(75) Inventor: David C. Platt, Mountain View, CA (US)

(73) Assignee: TiVo Inc., Alviso, CA (US)

( * ) Notice: Subject to any disclaimer, the term of this patent is extended or adjusted under 35 U.S.C. 154(b) by 700 days.

(21) Appl. No.: 12/190,020

(22) Filed: Aug. 12, 2008

(65) Prior Publication Data

US 2010/0042833 A1 Feb. 18, 2010

(51) Int. Cl.
| | |
|---|---|
| H04L 9/32 | (2006.01) |
| H04L 29/06 | (2006.01) |
| G06F 7/04 | (2006.01) |
| G06F 21/62 | (2013.01) |
| H04N 21/441 | (2011.01) |
| H04N 21/4415 | (2011.01) |
| H04N 21/478 | (2011.01) |
| H04N 21/258 | (2011.01) |

(52) U.S. Cl.
CPC ........ H04N 21/4415 (2013.01); G06F 21/6254 (2013.01); H04N 21/441 (2013.01); H04N 21/47815 (2013.01); H04N 21/25883 (2013.01)
USPC ............... 713/168; 713/160; 713/165; 726/4; 726/5; 726/26

(58) Field of Classification Search
USPC ...................... 713/168, 160, 165; 726/4, 5, 26
See application file for complete search history.

(56) References Cited

U.S. PATENT DOCUMENTS

| | | | |
|---|---|---|---|
| 6,850,252 | B1 | 2/2005 | Hoffberg |
| 7,095,854 | B1 | 8/2006 | Ginter et al. |
| 2004/0199789 | A1 | 10/2004 | Shaw et al. |
| 2005/0283621 | A1 | 12/2005 | Sato et al. |
| 2006/0168609 | A1 | 7/2006 | Chen |
| 2006/0178918 | A1 | 8/2006 | Mikurak |
| 2007/0053513 | A1 | 3/2007 | Hoffberg |
| 2007/0130070 | A1* | 6/2007 | Williams ..................... 705/50 |
| 2008/0310623 | A1* | 12/2008 | Phillips et al. .............. 380/29 |

OTHER PUBLICATIONS

Notification of the International Search Report and Written Opinion, Mailed Sep. 21, 2009, application No. PCT/US 09/53458, applicant: Tivo Inc., (7 pages).
Current claims for PCT application No. PCT/US 09/53458, (3 pages).
Canadian Intellectual Property Office, "Office Action" in application No. 2,732,625, dated Jul. 5, 2013, 2 pages.

(Continued)

*Primary Examiner* — Aravind Moorthy
(74) *Attorney, Agent, or Firm* — Hickman Palermo Truong Becker Bingham Wong LLP; Kirk D. Wong

(57) ABSTRACT

A method and system for providing data anonymously is provided. The method involves receiving an encrypted operator match ID by a client device from a first entity, where the encrypted operator match ID is encrypted using a first encryption key; decrypting the encrypted operator match ID using a first decryption key, associated with the first encryption key, by the client device to obtain a decrypted operator match ID; encrypting the decrypted operator match ID using a second encryption key by the client device to obtain a re-encrypted operator match ID; and sending the client device usage information with the re-encrypted operator match ID by the client device to a second entity through an anonymous channel, where the second entity decrypts the re-encrypted operator match ID using a second decryption key, associated with the second encryption key, to obtain the operator match ID.

33 Claims, 6 Drawing Sheets

(56) References Cited

OTHER PUBLICATIONS

Current Claims in application No. 2,732,625, dated Jul. 2013, 3 pages.
Australian Office Action in application No. 2009282075, dated Feb. 10, 2012, 2 pages.
Current Claims in application No. 2009282075, dated Feb. 2012, 3 pages.
European Patent Office, "European Search Report" in application No. 09807187.1-1956/2316067, dated Sep. 16, 2013, 8 pages.
Current Claims in application No. 09807187.1-1956/2316067, dated Sep. 2013, 3 pages.
The State Intellectual Property Office of the People's Republic of China, "Notification of Second Office Action" in application No. 200980140554.9, dated Jan. 3, 2014, 5 pages.
Current Claims in application No. 200980140554.9, dated Jan. 2014, 3 pages.

\* cited by examiner

DATA ANONYMITY SYSTEM

FIELD OF THE INVENTION

The present invention relates generally to data anonymity. The invention relates more specifically to anonymously receiving client device usage information from a client device.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Client devices are often used to provide content to a consumer. For example, a set-top box or a digital video recorder (DVR) may be used for recording, or display of video programming. In addition, media players such as an audio player may be used to listen to streaming audio content. Another example may involve a computer that a consumer may use to surf the internet and view consumer specified web pages. Furthermore, client devices may be used by professionals to obtain industry related materials. For example, a hand-held client device may be used by an attorney to obtain case law, or by a doctor to search for suitable medications for a particular illness. Furthermore, in addition to catering to a consumer's needs or wants, client devices often include advertisements within the content utilized by the consumer.

Data related to the use of the client devices may be analyzed to determine patterns. For example, content viewed by the consumer may be compared with purchases made by the consumer to determine correlation between the content viewed and the purchases made. Furthermore, known demographics of consumers viewing specified content may be used to effectively target the consumers with advertisements that are particularly suitable for the consumers within a demographic group. However, the use of the client devices and accordingly the data related to the use may be personal and accordingly, client device usage information that identifies a consumer may infringe on a consumer's rights, such as privacy rights.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION

Figure 1:
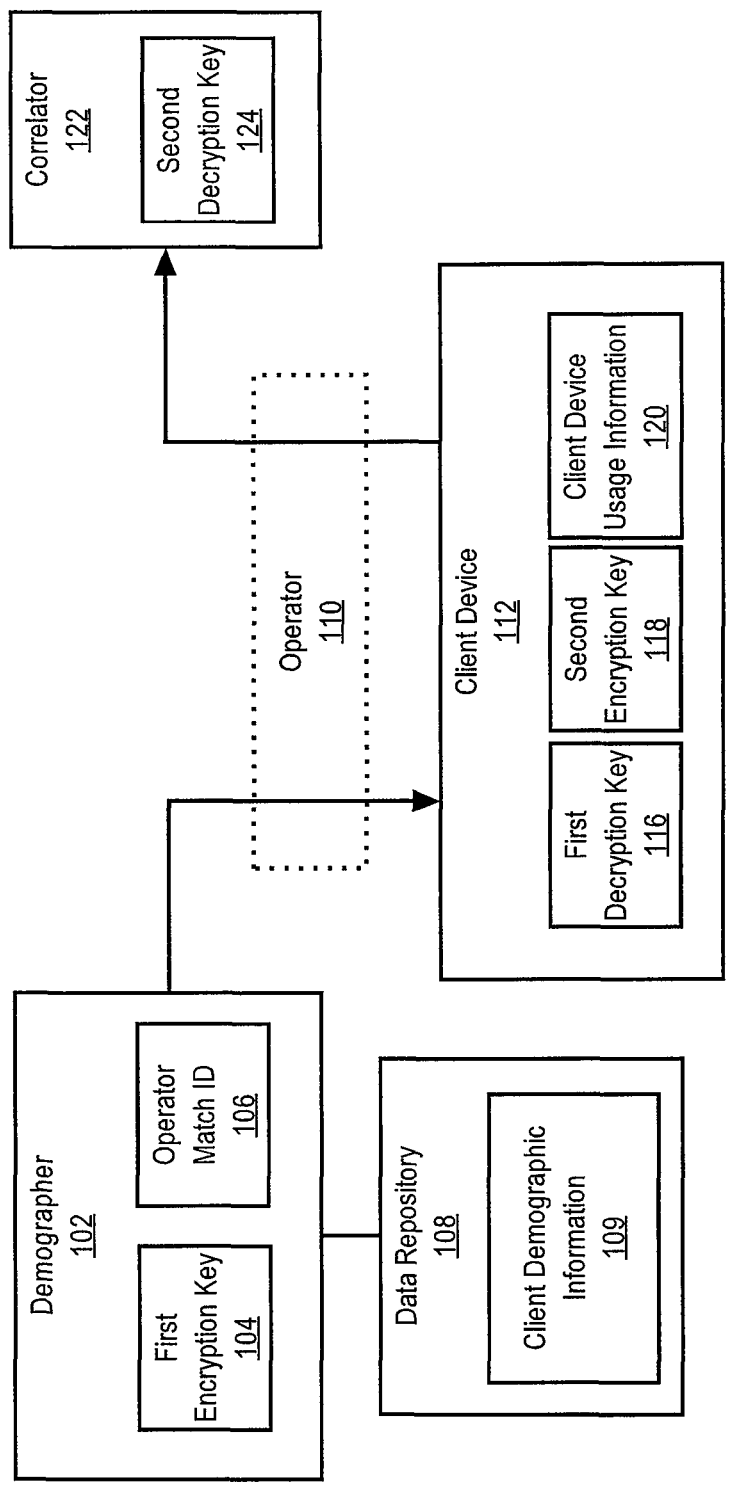
FIG. 1 is a block diagram illustrating a data anonymity system in accordance with one or more embodiments.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
  1.0 General Overview
  2.0 Architectural and Functional Overview
  3.0 Anonymous Data Submission Using Double Encryption
  4.0 Anonymous Data Submission Using Single Encryption
  5.0 Example of Correlation Between Client Device Usage Information and Client History from Merchants
  6.0 Example of Anonymous Data Submission
  7.0 Implementation Mechanisms—Hardware Overview
1.0 General Overview A method and system for providing data anonymously is described. In the following description, for the purposes of explanation, numerous specific details are set forth in order to provide a thorough understanding of the present invention. It will be apparent, however, that the present invention may be practiced without these specific details. In other instances, well-known structures and client devices are shown in block diagram form in order to avoid unnecessarily obscuring the present invention.

Specifically, a method and system for anonymously providing client device usage information is provided herein. In an embodiment, the method includes receiving an encrypted operator match ID by a client device from a first entity, where the encrypted operator match ID is encrypted using a first encryption key; decrypting the encrypted operator match ID using a first decryption key, associated with the first encryption key, by the client device to obtain a decrypted operator match ID; encrypting the decrypted operator match ID using a second encryption key by the client device to obtain a re-encrypted operator match ID; and sending the client device usage information with the re-encrypted operator match ID by the client device to a second entity through an anonymous channel, where the second entity decrypts the re-encrypted operator match ID using a second decryption key, associated with the second encryption key, to obtain the operator match ID.

In an embodiment, the method further includes updating the client device usage information to obtain updated client device usage information and sending the updated client device usage information with the re-encrypted operator match ID by the client device to the second entity, where the re-encrypted operator match ID is persistently stored on the client device.

In an embodiment, the anonymous channel prevents the second entity from identifying the client device.

In an embodiment, the method further includes receiving the operator match ID and purchasing history associated with the operator match ID by the second entity, wherein the second entity associates the client device usage information with the purchasing history based on the operator match ID.

In an embodiment, receiving the encrypted operator match ID by the client device from the first entity comprises: receiving the encrypted operator ID and a client device ID by a third entity from the first entity; and identifying the client device based on the client device ID by the third entity and forwarding the encrypted operator match ID by the third entity to the client device.

In an embodiment, the third entity provides a television programming service to the client device.

In an embodiment, sending the re-encrypted operator match ID and the client device usage information by the client device to the second entity through an anonymous channel comprises: sending the re-encrypted operator match ID and the client device usage information by the client device to a third entity through the anonymous channel; and forwarding the re-encrypted operator match ID and the client device usage information to the second entity by the third entity.

In an embodiment, the third entity forwards the re-encrypted operator match ID and the client device usage information with a plurality of operator match IDs and corresponding client device usage information for each of the plurality of operator match IDs, wherein a minimum number of operator match IDs and corresponding client device usage information are sent in each transmission to the second entity.

In an embodiment, the encrypted operator match ID is assigned to the client device by the first entity.

In an embodiment, the method includes receiving encrypted purchase history by a client device from a first entity, wherein the encrypted purchase history is encrypted using the second encryption key; and sending the encrypted purchase history with the re-encrypted operator match ID and the client device usage information to the second entity by the client device through the anonymous channel.

2.0 Architectural and Functional Overview

An embodiment of the invention can be described with reference to FIG. 1, a block diagram that illustrates a logical architecture of a data anonymity system. As shown in FIG. 1, the data anonymity system includes a demographer 102, an operator 110, a client device 112, and a correlator 122 which are communicatively coupled within the system through any communication interface, such as an Ethernet interface or wireless communications port. The data anonymity system may be implemented by any medium or mechanism that provides for the exchange of data between client devices within the network. Examples of the data anonymity system include, without limitation, a network such as a Local Area Network (LAN), Wide Area Network (WAN), the Internet, Intranet, Extranet with terrestrial, satellite or wireless links, etc. Alternatively or additionally, any number of components connected within the data anonymity system may also be directly connected to each other through a communications link.

In an embodiment, the demographer 102 corresponds to a process, program, service, computer system or computer system cluster that includes functionality to assign an operator match ID 106 to the client device 112. In an embodiment, the operator match ID 106 is generated by the demographer 102. The operator match ID 106 may include numbers, letters, symbols, or other suitable characters. Each operator match ID may be uniquely associated with a single client device 112, or a group of client devices 112 within a household. Furthermore, each operator match ID 106 may be associated with one or more persons within the household. For example, the operator match ID 106 may be associated with a licensor or owner of the client device 112. In another example, the operator match ID 106 may be associated with one or more people living at a household associated with the client device 112.

In an embodiment, the association between the operator match ID 106 and a corresponding consumer(s), household, etc. is represented with an association between the operator match ID 106 and the corresponding client demographic information 109 of the consumer(s), household, etc. In an embodiment, the client demographic information 109 may include any information associated with the consumer(s) or the household. For example, the client demographic information 109 may include a consumer's name, address, occupation, etc. Further the client demographic information 109 may include data about a household such as the number and age of household members, employment, income, personal buying habits, or other suitable information.

In an embodiment, the data repository 108, which includes the client demographic information 109 corresponds to any data storage device (e.g., local memory on the demographer 102 itself, multiple servers connected over the internet, systems within a local area network, a memory on a mobile device, etc.) known in the art which includes client demographic information 109. In one or more embodiments of the invention, access to the data repository 108 may be restricted and/or secured. As such, access to the data repository 108 may require authentication using passwords, secret questions, personal identification numbers (PINs), biometrics, and/or any other suitable authentication mechanism. Those skilled in the art will appreciate that elements or various portions of data stored in the data repository 108 may be distributed and stored in multiple data repositories (e.g., servers across the world). In one or more embodiments of the invention, the data repository 108 includes flat, hierarchical, network based, relational, dimensional, object modeled, or data files structured otherwise. For example, data repository 108 may be maintained as a table of a SQL database. In addition, data in the data repository 108 may be verified against data stored in other repositories.

In an embodiment, the client device 112 corresponds to any device used by a consumer. Examples of client devices 112 include, but are not limited to, set-top boxes, receivers, digital tuners, digital video recorders, media players, computers, and hand-held electronic devices. The client devices 112 may be associated with a single consumer or multiple consumers. For example, the client device 112 may be associated with the registered owner of the client device 112 or may be associated with all the members of a household in which the client device 112 is located. In another example, the client device 112 may be associated with a business where the client device 112 is used for soliciting business associates through advertisements.

In an embodiment, the demographer 102 and the client device 112 may be configured to communicate using encrypted data. The demographer 102 may be configured to encrypt the operator match ID 106 using a first encryption key 104 which is paired with a first decryption key 116 held by the client device 112. The first encryption key 104 and the first decryption key 116 may be asymmetric keys or symmetric keys. In an example involving asymmetric keys, the first encryption key 104 may be a public key, accessible to the demographer 102, and the first decryption key 116 may be a private key accessible only to the client device 112. The first encryption key 104 and the first decryption key 116 may both be created by the client device 112 and thereafter, the first encryption key 104 may be distributed by the client device 112 to the demographer 102. In an example involving symmetric keys, the first encryption key 104 and the first decryption key 116 may both be the same key, held secretly by the demographer 102 and the client device 112, respectively. The symmetric keys may be distributed using asymmetric keys. For example, one of the demographer 102 and the client device 112 may hold a public encryption key and the other of the demographer 102 and the client device 112 may hold a private decryption key. The entity holding the public encryption key may generate the symmetric keys, encrypt a symmetric key using the public encryption key, and send the encrypted symmetric key to entity holding the private decryption key for decryption. Accordingly, both parties, the demographer 102 and the client device 112 may each store one or a pair of secret symmetric keys that are identical.

In an embodiment, the client device 112 monitors usage by one or more consumers to obtain the client device usage information 120. In an embodiment, the client device usage information 120 includes data related to the content viewed and/or heard via the client device 112. For example, the client device usage information 120 may include data identifying the video programming and the advertisements displayed via the client device 112. Another example may involve a digital video recorder in which the client device usage information 120 may include data regarding which content was recorded, played, forwarded through, replayed, etc. The client device usage information 120 may also include the level of interaction of a consumer when viewing interactive content. For example, the client device usage information 120 may include the interaction of a consumer on a website displayed on a client device 112. In an embodiment, the client device usage information 120 may include usage by a single consumer, for example, when a consumer is required to log in to use the client device 112. In another embodiment, the client device usage information 120 may include usage by multiple consumers, for example, when multiple consumers within a household use the client device 112 without logging in or otherwise identifying the particular consumer using the client device 112.

In an embodiment, the correlator 122 corresponds to a process, program, service, computer system or computer system cluster that includes functionality to communicate directly or indirectly (via the operator 110) with the client device 112 to receive the client device usage information 120, where at least a portion of the communication link between the client device 112 and the correlator 122 is through an anonymous channel. The correlator 122 may receive the client device usage information 120 with an encrypted operator match ID 106, such that the correlator 122 is unable to identify the specific client device 112, the consumer, or household associated with the client device usage information 120. In an embodiment, the correlator 122 includes functionality to correlate the client device usage information 120 with other data also associated with the same operator match ID 106. The client device 112 and the correlator 122 may use a second encryption key 118 and a second decryption key 122, respectively, for data transmission from the client device 112 to the correlator 122. The second encryption key 118 and the second decryption key 122 may be symmetric keys or asymmetric keys, similar to the first encryption key 104 and the first decryption key 116, described above. Furthermore, if the second encryption key 118 and the second decryption key 122 are secret symmetric keys they may be distributed using asymmetric keys, similar to the first encryption key 104 and the first decryption key 116, described above.

In an embodiment, the operator 110 corresponds to a process, program, service, computer system or computer system cluster that includes functionality to communicate with the client device 112 by sending data to the client device 112 or receiving data from the client device 112. In an embodiment, the operator 110 includes functionality to forward an encrypted operator match ID 106 received from the demographer 102 to the client device 112 where the operator 110 is unable to decrypt or otherwise identify the operator match ID 106. Further, the operator 110 may also include functionality to forward data from the client device 112 to the correlator 122. In an embodiment, the operator 110 may also be a content provider that broadcasts or otherwise transmits content to the client device 112. The content may include video and/or audio programming.

3.0 Anonymous Data Submission Using Double Encryption

Figure 2:
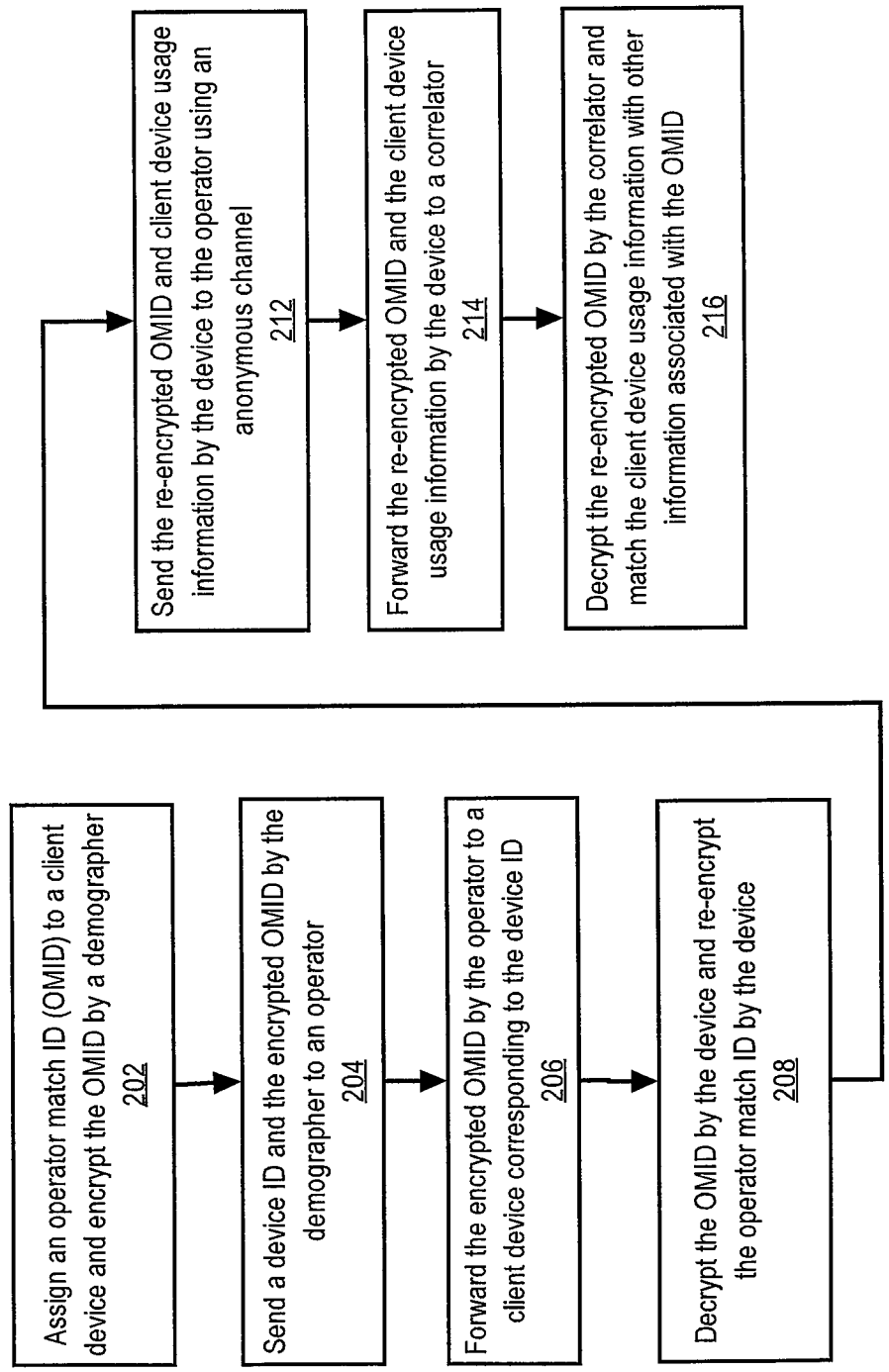
FIG. 2 is a flow diagram illustrating anonymous data submission in accordance with one or more embodiments.

FIG. 2 shows a flow chart for anonymous data submission in accordance with one or more embodiments. In one or more embodiments, one or more of the steps described below may be omitted, repeated, or performed in a different order. Accordingly, the specific arrangement of steps shown in FIG. 2 should not be construed as limiting the scope of the invention.

Initially, in Step 202, an operator match ID (OMID) is assigned to a client device and encrypted by a demographer in accordance with an embodiment of the invention. The operator match ID (OMID) may be assigned by using a deterministic or non-deterministic method. Further, the OMIDs may be assigned in a sequential or non-sequential order. In an embodiment, the OMID assigned to the client device may be the same OMID assigned to a consumer or household associated with the client device. In an embodiment, the OMID may be assigned by matching a consumer address with the addresses contained in an operator's database that are associated with client devices. In an embodiment, a copy of the OMID is encrypted such that the encrypted OMID can only be decrypted by the client device.

In step 204, the encrypted OMID and the device ID corresponding to the client device are sent to the operator, in accordance with an embodiment. The encrypted OMID and the device ID may be sent through a secure or insecure link. In step 206, the operator then forwards the encrypted OMID to the client device corresponding to the device ID. In an embodiment, any alternate method of identifying the client device may be used. For example, instead of a device ID, the demographer may send an address or consumer name with the encrypted OMID. In response, the operator may identify the client device based on the address or consumer name and forward the encrypted OMID to the identified client device. In an embodiment, Steps 204 and 206 may be omitted altogether. For example, the demographer may directly send the OMID to the client device. In this example, the OMID may be sent without encryption. Furthermore, if the OMID is sent directly from the demographer to the client device, the device ID need not be sent, as the client device does not need to be identified.

In Step 208, the OMID is decrypted by the client device and re-encrypted by the client device such that the OMID is accessible only to the correlator. In an embodiment, the decryption is immediately followed by re-encryption in order to prevent accessibility to the OMID by other devices. In an alternative embodiment discussed below in relation to FIG. 3, the demographer encrypts the OMID first with a public key corresponding to a private key held only by the correlator. In this embodiment, the OMID is forwarded through the operator to the client device and the client device is unable to decrypt the OMID. Furthermore, in this embodiment, since the OMID is already encrypted to be accessible only to the correlator, the client device does not re-encrypt the OMID.

In Step 212, the re-encrypted OMID and the client device usage information is sent to the operator through an anonymous channel such that the operator is unable to identify the client device sending the re-encrypted OMID and the client device usage information. In an embodiment, the anonymous channel may involve the use of one or more intermediate entities that strip the sender's information from the data prior to forwarding the data. Furthermore, any other techniques that allow for preventing the identification of the sender from being known may be used. In an embodiment, the encrypted or re-encrypted OMID is persistent on the client device. Accordingly, once the client device obtains the encrypted or re-encrypted OMID, the client device may include functionality to send client device usage information multiple times with a copy of the same encrypted or re-encrypted OMID. In an embodiment, the client device sends the client device usage information continuously, periodically, based on a threshold of data collected, randomly, or in any other suitable manner.

Figure 3:
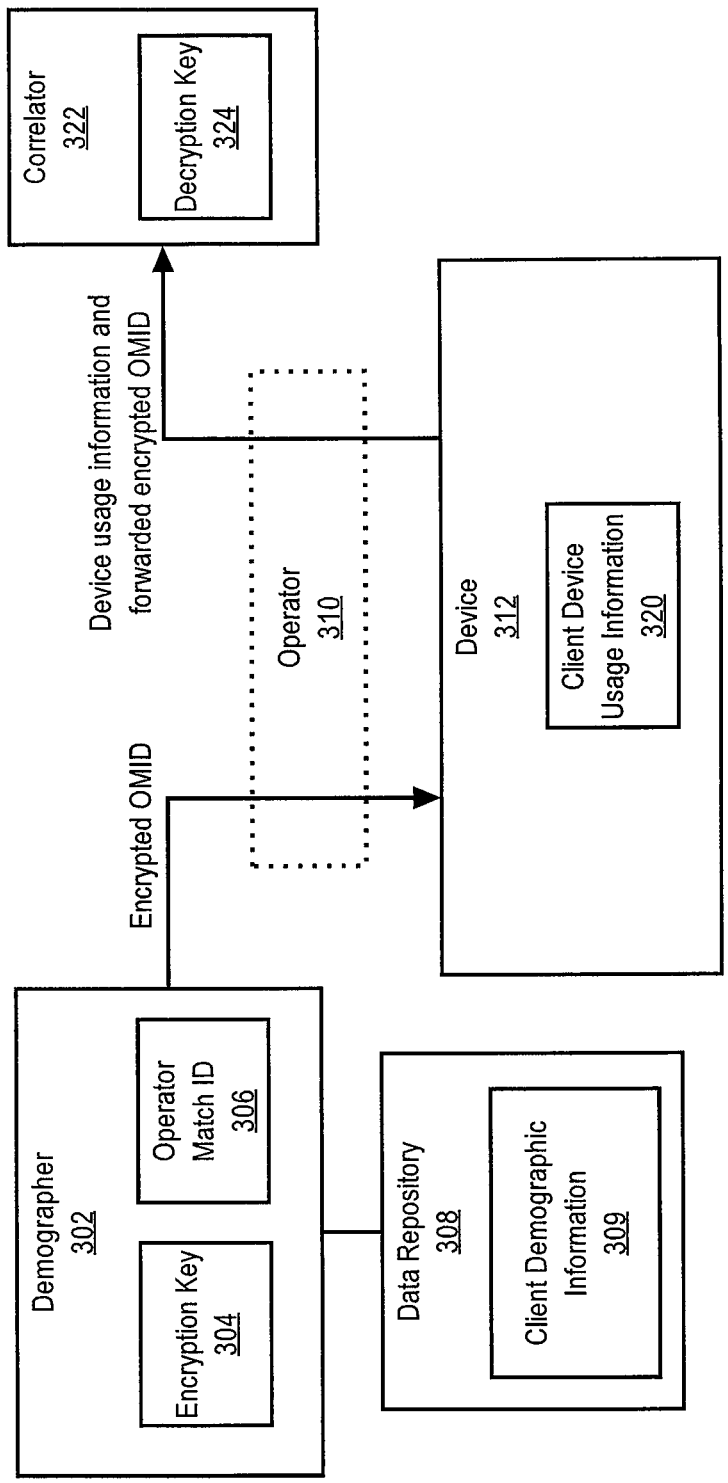
FIGS. 3 and 4 are block diagrams illustrating data anonymity systems in accordance with one or more embodiments.

In the embodiment, where the demographer has encrypted the OMID to make accessible only the correlator, the client device simply forwards a copy of the encrypted OMID back to the operator with each transmission of the client device usage information through the anonymous channel. The single encryption method is illustrated in FIG. 3 and further discussed below.

In Step 214, the operator forwards the encrypted OMID and the corresponding client device usage information received with the encrypted OMID to the correlator. In an embodiment, the operator may forward the client device usage information intermittently, randomly, on periodic schedule, or using any another suitable schedule. In an embodiment, Step 214 may be skipped altogether. In this embodiment, the client device may directly send the OMID and the client device usage information to the correlator via an anonymous channel, where the correlator is unable to identify the client device or the consumer(s) associated with the client device.

In Step 216, the correlator matches the client device usage information to any other data associated with the same OMID. For example, the correlator may receive client device usage information associated with an operator match ID and may receive client demographic information associated with the same operator match ID. In this example, the correlator may then correlate the client demographic information and the client device usage information based on the association with the same operator match ID. In an embodiment, the correlator may similarly correlate the client device usage information with any data such as buying habits, income statistics, consumer(s) age, household equity value, vacation itineraries, services used etc, without being able to identify the consumer or household associated with the client device.

4.0 Anonymous Data Submission Using Single Encryption

An embodiment of the invention can be described with reference to FIG. 3, a block diagram that illustrates a logical architecture of a data anonymity system. FIG. 3 includes essentially the same components illustrated in FIG. 1 and discussed above.

However, in an embodiment of the invention, as shown in FIG. 3, the demographer 302 includes an encryption key 304 that corresponds to a decryption key 324 held by the correlator. Accordingly, in this embodiment, the operator match ID 306 is encrypted using the encryption key 304 and is not decrypted by the client device 312. Instead, the demographer sends the encrypted operator match ID 306 to the client device 312. Thereafter, the encrypted operator match ID 306 is forwarded to the correlator through an anonymous channel along with client device usage information by the client device 312. Further, the encrypted operator ID 306 from the demographer 302 to the client device 312 may or may not be forwarded through an operator 310 or other intermediate device. In addition, the same encrypted operator ID 306 along with the client device usage information 320 may or may not be sent through the operator 310 on the way from the client device 312 to the correlator 322.

Figure 4:
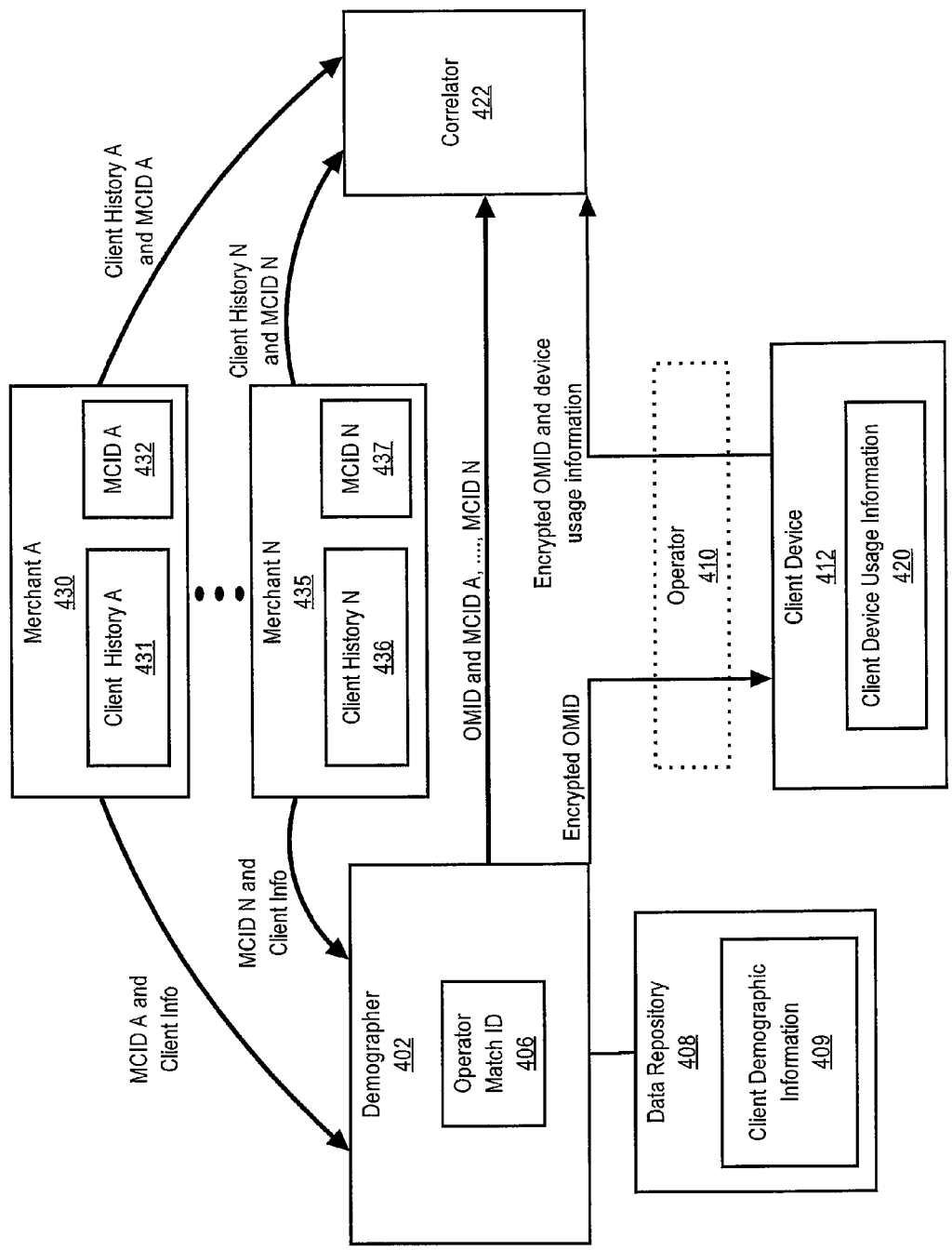

5.0 Example of Correlation Between Client Device Usage Information and Client History From Merchants An embodiment of the invention can be described with reference to FIG. 4, a block diagram that illustrates a logical architecture of a data anonymity system. FIG. 4 includes some of the components illustrated in FIG. 1 and described above.

Further, FIG. 4 includes one or more merchants (e.g., Merchant A 430 and Merchant N 435) that interact with the demographer 402 and the correlator 422. The merchants correspond to any entity that is patronized by a client and accordingly have a client history with the client. Examples of merchants include businesses, financial institutions, service providers, schools, public services, etc. The client history (e.g., client history A 431 and client history N 436) maintained for each client may include purchasing history, purchasing habits/trends, services received, credit scores, education, resources utilized etc. Further, the merchants may assign each of the clients with a Merchant's Customer Identification (MCID). Each merchant may maintain a set of MCID's for a corresponding set of clients or global MCIDs may be used for two or more merchants.

In an embodiment, the merchants may include functionality to provide the MCID and corresponding the client info (e.g., name, address, social security number, or other client identifying information) to the demographer 402. Accordingly, the demographer 402 may receive, from each merchant, a set of MCIDs and corresponding client identification information. The demographer may include functionality to compare the client identification information associated with the MCIDs with the client demographic information 409 associated with the OMIDs to determine which MCID(s) and OMID correspond to the same client. Based on association with the same client, the demographer 402 may group the OMID 406 with the (one or more) corresponding MCIDs and provide the OMID 406 and corresponding MCIDs to the correlator 422.

Accordingly, the correlator may receive (1) OMID 406 and the corresponding client device usage information 420 (directly or indirectly) from the client device 412, (2) the client history and corresponding MCID from each of the merchants patronized by the client, and (3) a list of one or more MCIDs corresponding to each OMID. Based on the pairing between the OMID and the MCIDs, the correlator may determine which client device usage information 420 corresponds with which client history without identifying the client.

6.0 Example of Anonymous Data Submission

Figure 5:
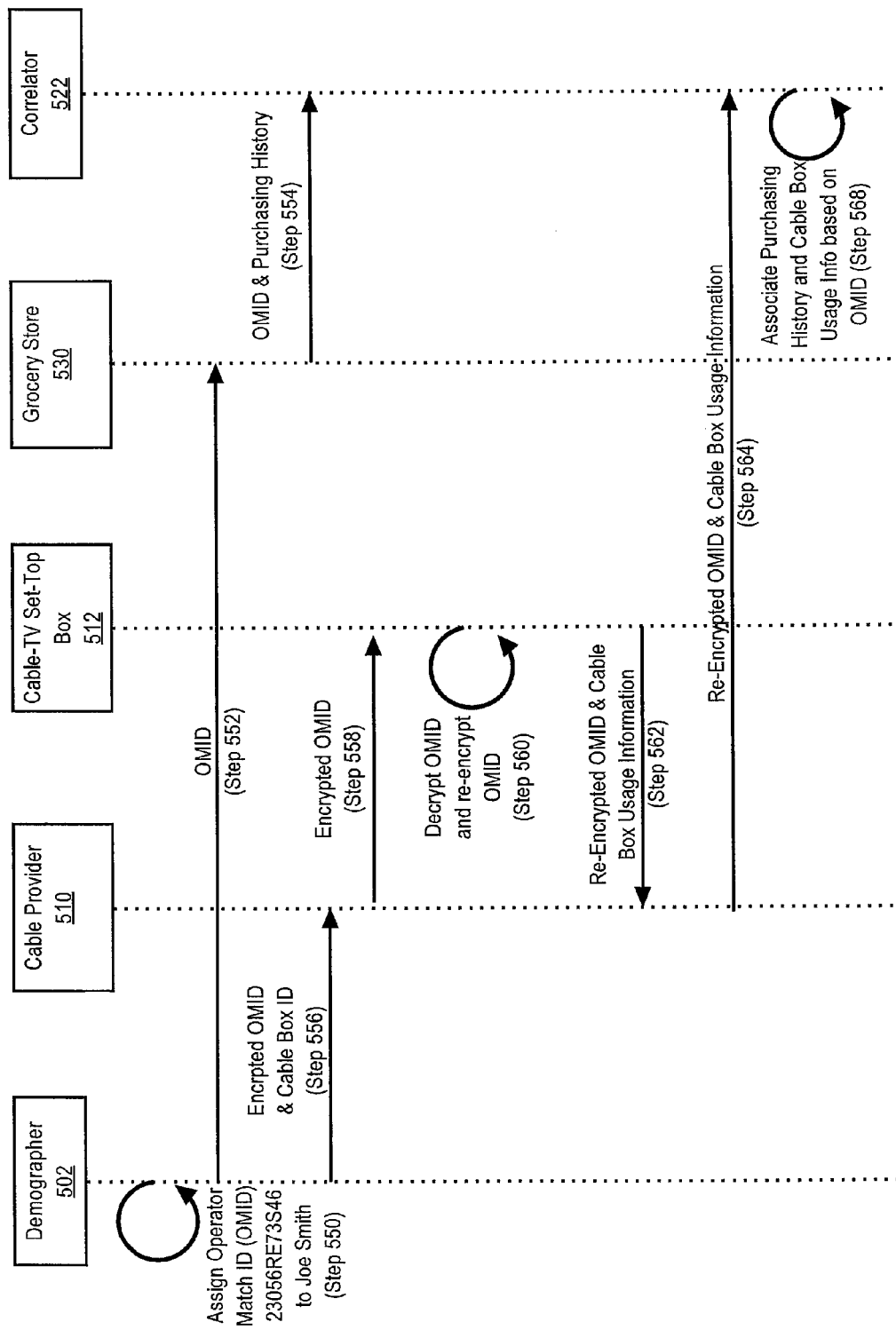
FIG. 5 is a flow diagram illustrating an example in accordance with one or more embodiments.

FIG. 5 shows a flow chart of an example of anonymous data submission in accordance with one or more embodiments. In one or more embodiments, one or more of the steps described below may be omitted, repeated, modified, or performed in a different order. Furthermore, additional steps that may be involved may not be illustrated within the example. Accordingly, the example illustrated in FIG. 5 should not be construed as limiting the scope of the invention.

The example involves a demographer 502 with demographic information about a consumer Joe Smith, cable provider 510 (similar to operator 110 and 310) which provides a cable service to Joe Smith, cable-TV set-top box 512 (similar to client device 112 or 312) which is used within Joe Smith's household to receive cable service from the cable provider 510, grocery store 530 frequented by Joe Smith for grocery shopping, and correlator 522.

Initially in Step 550, the demographer 502 assigns OMID 23056RE73S56 to Joe Smith. In Step 552, the demographer 502 sends the OMID to the grocery store 530. The grocery store records Joe Smith's purchasing history and in Step 554, sends the OMID and the purchasing history to the correlator 522 without providing any information that identifies Joe Smith. Further, in Step 556, the demographer 502 sends an encrypted copy of the OMID along with a device ID of cable-TV set-top box 512 used in Joe Smith's household to Joe Smith's cable provider 510. The cable provider identifies Joe Smith's cable-TV set-top box 512 based on the device ID and in Step 558, forwards the encrypted OMID to the cable-TV set-top box 512. In Step 560, the cable-TV set-top box decrypts the OMID and immediately re-encrypts the OMID to allow access only by the correlator 522. Thereafter, in Step 562, the re-encrypted OMID is sent to the cable provider 510 along with the cable box usage information recorded by the cable-TV set-top box 512 through an anonymous channel. Accordingly, the cable provider 510 receives the cable box usage information and the re-encrypted OMID without being able to identify the cable-TV set-top box 512 or Joe Smith as associated with the cable box usage information. In Step 564, the cable provider 510 then forwards the re-encrypted OMID and the cable box usage information to the correlator 522. Accordingly, the correlator receives the cable box usage information identified only by the OMID and purchasing history also identified only by the OMID. Further, the correlator 522 is unable to identify Joe Smith or the cable-TV set-top box as associated with the OMID, the purchasing history, or the cable box usage information. The correlator 522 identifies the purchasing history and the cable box usage information as associated with the same OMID. In Step 568, based on the association with the same OMID, the correlator 522 associates the cable box usage information with the purchasing history. The correlation may be analyzed to determine many different relationships or patterns. An example may include determining a relationship between advertisements viewed (from the cable box usage information) and items bought (from the purchasing history) to determine the effect the advertisements have on consumers.

Although this example illustrates the use of the OMID by the grocery store 530, embodiments of the invention also for the use of an MCID by the merchant as described above in relation to FIG. 4. In such an embodiment, the grocery store 530 would provide the purchasing history along with an MCID to the correlator 522. Further, the grocery store may provide the MCID and the client's name "Joe Smith" to the demographer 502. The demographer 502, based on the name (and/or address, social security number, etc.), would determine the OMID associated with Joe Smith, and provide the OMID and MCID to the correlator 522 without identifying the client, Joe Smith. Finally, the correlator 522 would correlate the cable box usage information from Joe Smith's cable-tv set-top box with Joe Smith's purchasing history without ever identifying the client, Joe Smith himself.

7.0 Implementation Mechanisms—Hardware Overview

Figure 6:
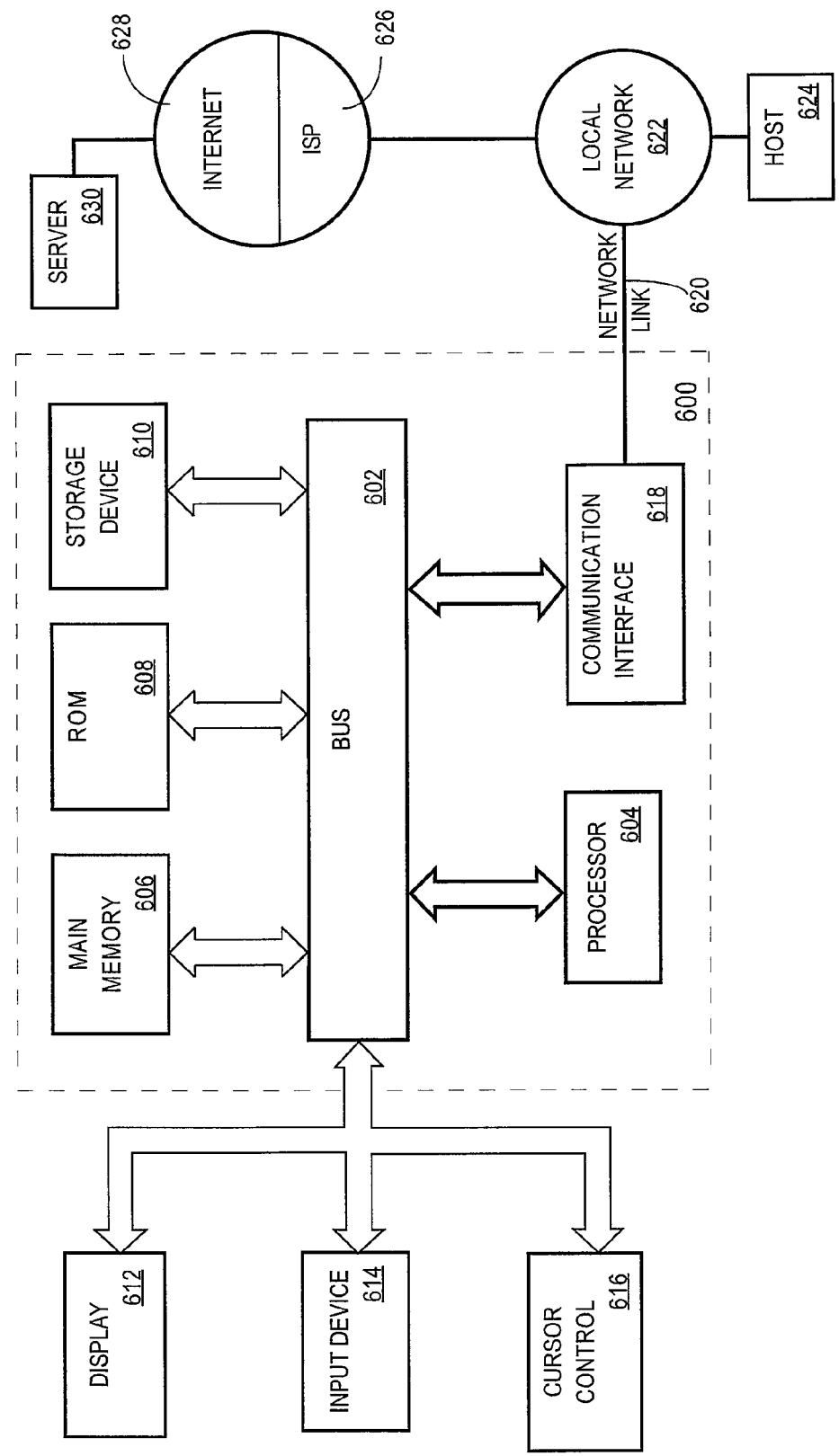
FIG. 6 is a block diagram illustrating a system on which one or more embodiments of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for anonymous data submission. According to one embodiment of the invention, anonymous data submission is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for anonymous data submission as described herein. The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for anonymous data collection, comprising:
    receiving, at a client device from a first entity, an encrypted operator match ID corresponding to the client device, wherein the encrypted operator match ID is encrypted using a first encryption key;
    decrypting the encrypted operator match ID using a first decryption key, associated with the first encryption key, by the client device to obtain a decrypted operator match ID;
    encrypting the decrypted operator match ID using a second encryption key by the client device to obtain a re-encrypted operator match ID; and
    sending, by the client device to a second entity, client device usage information for the client device and the re-encrypted operator match ID;
    wherein the second entity decrypts the re-encrypted operator match ID using a second decryption key, associated with the second encryption key, to obtain an operator match ID.

2. The method of claim 1, further comprising updating the client device usage information to obtain updated client device usage information and sending the updated client device usage information with the re-encrypted operator match ID by the client device to the second entity, wherein the re-encrypted operator match ID is persistently stored on the client device.

3. The method of claim 1, wherein the client device usage information is sent by the client device to the second entity through an anonymous channel, wherein the anonymous channel prevents the second entity from identifying the client device.

4. The method of claim 1, further comprising receiving the operator match ID and purchasing history associated with the operator match ID by the second entity, wherein the second entity associates the client device usage information with the purchasing history based on the operator match ID.

5. The method of claim 1, wherein receiving the encrypted operator match ID by the client device from the first entity comprises:
    receiving the encrypted operator ID and a client device ID by a third entity from the first entity; and
    identifying the client device based on the client device ID by the third entity and forwarding the encrypted operator match ID by the third entity to the client device.

6. The method of claim 5, wherein the third entity provides a television programming service to the client device.

7. The method of claim 1, wherein the re-encrypted operator match ID and the client device usage information are sent by the client device to the second entity through an anonymous channel at least by:
    sending the re-encrypted operator match ID and the client device usage information by the client device to a third entity through the anonymous channel; and
    forwarding the re-encrypted operator match ID and the client device usage information to the second entity by the third entity.

8. The method of claim 7, wherein the third entity forwards the re-encrypted operator match ID and the client device usage information with a plurality of operator match IDs and corresponding client device usage information for each of the plurality of operator match IDs, wherein a minimum number of operator match IDs and corresponding client device usage information are sent in each transmission to the second entity.

9. The method of claim 1, wherein the encrypted operator match ID is assigned to the client device by the first entity.

10. The method of claim 1, further comprising:
    receiving encrypted purchase history by a client device from a first entity, wherein the encrypted purchase history is encrypted using the second encryption key; and
    sending the encrypted purchase history with the re-encrypted operator match ID and the client device usage information to the second entity by the client device through an anonymous channel.

11. A method for providing client device usage information, comprising:

receiving, at a client device from a first entity, an encrypted operator match ID corresponding to the client device, wherein the encrypted operator match ID is encrypted using an encryption key, wherein data encrypted by the encryption key can be decrypted using a decryption key held by a second entity;

forwarding, by the client device to the second entity, the encrypted operator match ID and client device usage information for the client device, wherein the client device usage information identifies prior usage of the client device; and decrypting the encrypted operator match ID using the decryption key by the second entity.

12. A non-transitory computer readable storage medium having encoded instructions which, when executed by one or more processors, cause the one or more processors to perform the steps of:

receiving, at a client device from a first entity, an encrypted operator match ID corresponding to the client device, wherein the encrypted operator match ID is encrypted using a first encryption key;

decrypting the encrypted operator match ID using a first decryption key, associated with the first encryption key, by the client device to obtain a decrypted operator match ID;

encrypting the decrypted operator match ID using a second encryption key by the client device to obtain a re-encrypted operator match ID; and sending, by the client device to a second entity, client device usage information for the client device and the re-encrypted operator match ID;

wherein the second entity decrypts the re-encrypted operator match ID using a second decryption key, associated with the second encryption key, to obtain an operator match ID.

13. The non-transitory computer readable storage medium of claim 12, wherein the encoded instructions, when executed by one or more processors, cause the one or more processors to further perform the steps of updating the client device usage information by the client device to obtain updated client device usage information and sending the updated client device usage information with the re-encrypted operator match ID by the client device to the second entity, wherein the re-encrypted operator match ID is persistently stored on the client device.

14. The non-transitory computer readable storage medium of claim 12, wherein the client device usage information is sent by the client device to the second entity through an anonymous channel, wherein the anonymous channel prevents the second entity from identifying the client device.

15. The non-transitory computer readable storage medium of claim 12, wherein the encoded instructions, when executed by one or more processors, cause the one or more processors to further perform the step of receiving the operator match ID and purchasing history associated with the operator match ID by the second entity, wherein the second entity associates the client device usage information with the purchasing history based on the operator match ID.

16. The non-transitory computer readable storage medium of claim 12, wherein receiving the encrypted operator match ID by the client device from the first entity comprises:

receiving the encrypted operator ID and a client device ID by a third entity from the first entity; and identifying the client device based on the client device ID by the third entity and forwarding the encrypted operator match ID by the third entity to the client device.

17. The non-transitory computer readable storage medium of claim 16, wherein the third entity provides a television programming service to the client device.

18. The non-transitory computer readable storage medium of claim 17, wherein the third entity forwards the re-encrypted operator match ID and the client device usage information with a plurality of operator match IDs and corresponding client device usage information for each of the plurality of operator match IDs, wherein a minimum number of operator match IDs and corresponding client device usage information are sent in each transmission to the second entity.

19. The non-transitory computer readable storage medium of claim 12, wherein the re-encrypted operator match ID and the client device usage information by the client device are sent to the second entity through an anonymous channel at least by:

sending the re-encrypted operator match ID and the client device usage information by the client device to a third entity through the anonymous channel; and forwarding the re-encrypted operator match ID and the client device usage information to the second entity by the third entity.

20. The non-transitory computer readable storage medium of claim 12, wherein the encrypted operator match ID is assigned to the client device by the first entity.

21. The non-transitory computer readable storage medium of claim 12, wherein the encoded instructions, when executed by one or more processors, cause the one or more processors to further perform the steps of:

receiving encrypted purchase history by a client device from a first entity, wherein the encrypted purchase history is encrypted using the second encryption key; and sending the encrypted purchase history with the re-encrypted operator match ID and the client device usage information to the second entity by the client device through an anonymous channel.

22. A system for anonymous data collection, comprising:

a subsystem, implemented at least partially in hardware, of a client device, that receives, from a first entity, an encrypted operator match ID corresponding to the client device, wherein the encrypted operator match ID is encrypted using a first encryption key;

a subsystem, implemented at least partially in hardware, of the client device, that decrypts the encrypted operator match ID using a first decryption key, associated with the first encryption key, to obtain a decrypted operator match ID;

a subsystem, implemented at least partially in hardware, of the client device, that encrypts the decrypted operator match ID using a second encryption key to obtain a re-encrypted operator match ID; and a subsystem, implemented at least partially in hardware, of the client device, that sends, to a second entity, client device usage information for the client device and the re-encrypted operator match ID;

wherein the second entity is configured to decrypt the re-encrypted operator match ID using a second decryption key, associated with the second encryption key, to obtain an operator match ID.

23. The system of claim 22, wherein the system for anonymous data collection further comprises: a subsystem, implemented at least partially in hardware, of the client device, that updates the client device usage information to obtain updated client device usage information and sends the updated client device usage information with the re-encrypted operator match ID to the second entity, wherein the re-encrypted operator match ID is persistently stored on the client device.

24. The system of claim 22, wherein the subsystem that sends the client device usage information, sends the client device usage information to the second entity through an anonymous channel, wherein the anonymous channel prevents the second entity from identifying the client device.

25. The system of claim 22, wherein the system for anonymous data collection further comprises a subsystem, implemented at least partially in hardware, of the second entity, that receives the operator match ID and purchasing history associated with the operator match ID, wherein the second entity is configured to associate the client device usage information with the purchasing history based on the operator match ID.

26. The system of claim 22, wherein the subsystem that receives the encrypted operator match ID, receives the encrypted operator match ID by:
   a subsystem, implemented at least partially in hardware, of a third entity, that receives the encrypted operator ID and a client device ID from the first entity; and
   a subsystem, implemented at least partially in hardware, of a third entity, that identifies the client device based on the client device ID and forwards the encrypted operator match ID to the client device.

27. The system of claim 22, wherein the subsystem that sends the re-encrypted operator match ID and the client device usage information, sends the re-encrypted operator match ID and the client usage information through an anonymous channel and is configured to cause:
   sending the re-encrypted operator match ID and the client device usage information by the client device to a third entity; and
   forwarding the re-encrypted operator match ID and the client device usage information to the second entity by the third entity through the anonymous channel.

28. The system of claim 27, wherein the third entity provides a television programming service to the client device.

29. The system of claim 27, wherein the third entity is configured to forward the re-encrypted operator match ID and the client device usage information with a plurality of operator match IDs and corresponding client device usage information for each of the plurality of operator match IDs, wherein a minimum number of operator match IDs and corresponding client device usage information are sent in each transmission to the second entity.

30. The system of claim 22, wherein the encrypted operator match ID is assigned to the client device by the first entity.

31. The system of claim 22, wherein the system further comprises:
   a subsystem, implemented at least partially in hardware, of the client device, that receives encrypted purchase history from a first entity, wherein the encrypted purchase history is encrypted using the second encryption key; and
   a subsystem, implemented at least partially in hardware, of the client device, that sends the encrypted purchase history with the re-encrypted operator match ID and the client device usage information to the second entity through an anonymous channel.

32. A non-transitory computer readable storage medium having encoded instructions which, when executed by one or more processors, cause the one or more processors to perform the steps of:
   receiving, at a client device from a first entity, an encrypted operator match ID corresponding to the client device, wherein the encrypted operator match ID is encrypted using an encryption key, wherein data encrypted by the encryption key can be decrypted using a decryption key held by a second entity;
   forwarding, by the client device to the second entity, the encrypted operator match ID and client device usage information for the client device, wherein the client device usage information identifies prior usage of the client device; and
   decrypting the encrypted operator match ID using the decryption key by the second entity.

33. A system for anonymous data collection, comprising:
   a subsystem, implemented at least partially in hardware, of a client device, that receives from a first entity, an encrypted operator match ID corresponding to the client device, wherein the encrypted operator match ID is encrypted using an encryption key, wherein data encrypted by the encryption key can be decrypted using a decryption key held by a second entity;
   a subsystem, implemented at least partially in hardware, of the client device, that forwards, to the second entity, the encrypted operator match ID and client device usage information for the client device, wherein the client device usage information identifies prior usage of the client device; and
   a subsystem, implemented at least partially in hardware, of the second entity, that decrypts the encrypted operator match ID using the decryption key.

* * * * *